(12) United States Patent
Kato et al.

(10) Patent No.: US 6,487,353 B2
(45) Date of Patent: Nov. 26, 2002

(54) DISPERSION-SHIFTED OPTICAL FIBER

(75) Inventors: Takatoshi Kato; Eisuke Sasaoka; Masayuki Nishimura, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 9 days.

(21) Appl. No.: 09/850,055

(22) Filed: May 8, 2001

(65) Prior Publication Data

US 2001/0028774 A1 Oct. 11, 2001

Related U.S. Application Data

(63) Continuation of application No. 09/586,966, filed on Jun. 5, 2000, now Pat. No. 6,256,440, which is a continuation-in-part of application No. PCT/JP98/05182, filed on Nov. 18, 1998.

(51) Int. Cl.[7] ................................. G02B 6/02
(52) U.S. Cl. ..................................... 385/127
(58) Field of Search ......................... 385/127

(56) References Cited

U.S. PATENT DOCUMENTS

| | | | |
|---|---|---|---|
| 5,675,688 A | 10/1997 | Nouchi et al. | |
| 5,684,909 A | 11/1997 | Liu | 385/127 |
| RE37,457 E | * 11/2001 | Nouchi et al. | 359/161 |
| 6,335,995 B1 | * 1/2002 | Kato et al. | 385/123 |

FOREIGN PATENT DOCUMENTS

| | | |
|---|---|---|
| EP | 0 724 171 | 7/1996 |
| EP | 0 724 171 A | 7/1996 |
| EP | 0 789 257 A | 8/1997 |
| JP | 9-505909 | 6/1997 |
| JP | 9-211249 | 8/1997 |
| JP | 9-318833 | 12/1997 |
| JP | 10-239550 | 9/1998 |

OTHER PUBLICATIONS

Mori et al., 1.5 $\mu$m Broadband Amplification by Tellurite–Based EDFAs, NTT Opto–Electronics Laboratories, Jun. 1998, pp. PD11–4.
XP 000671962, Nov. 13, 1990, Attenuation and Bending Loss of Vad Dual Shape Core Dispersion—Shifted Fiber, by Y. Takahashi, et al., pp. 18–22, Figures 2, 6.
XP 000698961, ISSN: 0013–5194, A. Mori, et al., Erbium–Doped Tellurite Glass Fibre Laser and Amplifier, Electronics Letters, GB, vol. 33, No. 10, May 1, 1997, pp. 863–864.
Optical Fibers and Amplifiers for WDM Systems, by Michael J. Yadlowsky et al., XP–000755847, pp. 1765–1779, vol. 85, No. 11, Nov. 1997.
New Dispersion Shifted Fiber with Effective Area Larger than 90$\mu$m$^2$, XP–000775986, by P. Nouchi et al., pp.1.49–1.52, 22$^{nd}$ European Conference on Optical Communication.

* cited by examiner

*Primary Examiner*—Hung N. Ngo
(74) *Attorney, Agent, or Firm*—McDermott, Will & Emery

(57) ABSTRACT

The present invention relates to a dispersion-shifted optical fiber suitable for an optical transmission line having an optical fiber amplifier with a wider amplification band. In particular, the dispersion-shifted optical fiber according to the present invention has a zero-dispersion wavelength of 1610 nm or more but 1750 nm or less, and a cutoff wavelength of 1.1 $\mu$m or more at a length of 2 m in order to suppress the bending loss to a practically permissible range, and has, with respect to light having a wavelength of 1550 nm, an effective area of 45 $\mu$m$^2$ or more and a dispersion slope of 0.15 ps/nm$^2$/km or less in order to suppress the occurrence of nonlinear phenomena.

11 Claims, 8 Drawing Sheets

Fig.15

| | ZERO-DISPERSION WAVELENGTH (nm) | EFFECTIVE AREA ($\mu m^2$) | DISPERSION SLOPE (ps/nm²/km) | CUTOFF WAVELENGTH AT 2m LENGTH ($\mu m$) | BENDING LOSS AT 32mm DIAMETER (dB/TURN) | DISPERSION (ps/nm/km) |
|---|---|---|---|---|---|---|
| 1ST EMBODIMENT | 1645 | 56 | 0.13 | 1.46 | 0.01 | -12.2 |
| 2ND EMBODIMENT | 1628 | 71 | 0.14 | 1.59 | 0.12 | -11.9 |
| 3RD EMBODIMENT | 1654 | 57 | 0.15 | 1.35 | 0.08 | -15.2 |
| 4TH EMBODIMENT | 1624 | 71 | 0.15 | 1.45 | 0.13 | -12.5 |
| 5TH EMBODIMENT | 1653 | 56 | 0.08 | 1.68 | 0.03 | -9.1 |
| 6TH EMBODIMENT | 1634 | 53 | 0.09 | 1.58 | $5 \times 10^{-10}$ | -7.7 |
| 7TH EMBODIMENT | 1658 | 73 | 0.09 | 1.60 | $3 \times 10^{-5}$ | -10.4 |
| 8TH EMBODIMENT | 1663 | 70 | 0.08 | 1.52 | $4 \times 10^{-4}$ | -9.0 |
| 9TH EMBODIMENT | 1625 | 94 | 0.07 | 1.68 | $4 \times 10^{-4}$ | -4.9 |
| 10TH EMBODIMENT | 1708 | 47 | 0.08 | 1.62 | 0.01 | -16.0 |

DISPERSION-SHIFTED OPTICAL FIBER

RELATED APPLICATIONS

This is a Continuation of National Application Ser. No. 09/586,966 filed Jun. 5, 2000 now U.S. Pat. No. 6,256,440.

This is a Continuation-In-Part application of International Patent application Ser. No. PCT/JP98/05182 filed on Nov. 18, 1998, now pending.

BACKGROUND OF THE INVENTION

1. Field of the Invention

The present invention relates to a single-mode optical fiber usable as a transmission line in optical communications and the like; and, in particular, to a dispersion-shifted optical fiber suitable for wavelength division multiplexing (WDM) transmission.

2. Related Background Art

In general, a WDM transmission system using optical fiber networks is a system enabling long-distance, large-capacity optical data communications, and is constituted by a transmitter/receiver for transmitting and receiving WDM signals of a plurality of wavelengths (light signals), an optical amplifier such as an optical fiber amplifier for amplifying the WDM signals, an optical fiber which is a transmission medium, and the like. In such a WDM transmission system, the wavelength band that can optically be amplified in the optical amplifier is from 1530 nm to 1560 nm, whereas the low-loss wavelength band in the optical fiber is from 1400 nm to 1700 nm. As a consequence, the wavelength band utilizable as the WDM signals in the conventional WDM transmission system has substantially been limited to a width of about 30 nm from 1530 nm to 1560 nm.

The amplification of WDM signals by the optical amplifier increases the optical power of each light signal in the optical fiber acting as the transmission medium, thereby causing nonlinear phenomena such as four-wave mixing, self phase modulation, modulation instability, and the like. In particular, the four-wave mixing causes power variations among the individual signal components, whereas the self phase modulation distorts the pulse waveform of each light signal upon an interaction with the chromatic aberration of the optical fiber (hereinafter referred to as dispersion), whereby the occurrence of such nonlinear phenomena limits the normal transmission of light signal.

SUMMARY OF THE INVENTION

The inventors have studied the case where a conventional dispersion-shifted optical fiber is employed in a WDM transmission system and, as a result, have found problems as follows.

Namely, for effectively s Oppressing the four-wave mixing, it is preferred that the wavelength of each light signal be different from the zero-dispersion wavelength of the optical fiber. For effectively suppressing the self phase modulation, on the other hand, it is preferred that the absolute value of dispersion value of the optical fiber with respect to each light signal be not so large.

When the four-wave mixing and the self phase modulation are compared with each other, the distortion in pulse waveform of each light signal caused by the self phase modulation can be alleviated to a certain extent by a dispersion-compensating technique in which a dispersion-compensating optical fiber (having a dispersion characteristic with a polarity opposite to that of the dispersion value of the optical fiber acting as the transmission medium) is inserted in the optical transmission line through which each light signal propagates, so that the dispersion value of the optical transmission line as a whole becomes nearly zero. By contrast, no technique has been known for compensating for the crosstalk between individual light signals caused by the four-wave mixing. Therefore, as compared with the self phase modulation, it is more important to suppress the four-wave mixing.

In view of the increase in noise components caused by the modulation instability, on the other hand, it is preferred that the zero-dispersion wavelength be set on the longer wavelength side from the wavelength band of each light signal. Further, letting N2 be the nonlinear refractive index of the optical fiber, $A_{eff}$ be the effective area thereof, P be the power of light the propagating therethrough, and $L_{eff}$ be the effective length of the optical fiber, the amount of occurrence of nonlinear phenomena in the optical fiber is given by the following expression (1):

$$N2 \cdot P \cdot L_{eff} / A_{eff} \qquad (1)$$

Among these parameters, the nonlinear refractive index N2 is determined by the material of the optical fiber, whereby it is necessary for the effective area $A_{eff}$ of the optical fiber to increase in order to reduce the amount of occurrence of nonlinear phenomena.

Here, as shown in Japanese Patent Application Laid-Open No. HEI 8-248251 (EP 0 724 171 A2), the above-mentioned effective area $A_{eff}$ is given by the following expression (2):

$$A_{eff} = 2\pi \left( \int_0^\infty E^2 r \, dr \right)^2 \Big/ \left( \int_0^\infty E^4 r \, dr \right) \qquad (2)$$

where E is the electric field accompanying the propagating light, and r is the radial distance from the center of the core region.

In the conventional WDM transmission system, as a result of the foregoing studies, it is preferred that the zero-dispersion wavelength of the optical fiber be restricted to the range of 1560 nm to 1600 nm, and that its effective area $A_{eff}$ be 50 $\mu m^2$ or more. Further, for suppressing the increase in loss upon cabling the optical fiber, it is preferred that its bending loss be smaller, whereby its cutoff wavelength must be set to an appropriate value.

In the conventional WDM transmission system, the channel spacing between the individual light signals included in the WDM signals is about 1 nm, whereby the actual multiplicity has been limited to about 30 waves. For enhancing the transmission capacity, however, it is desirable that the wavelength multiplicity be increased. In this case, while a method of narrowing the channel spacing and a method of enlarging the wavelength bandwidth can be considered, the latter is preferred in view of the above-mentioned suppression of four-wave mixing.

On the other hand, the amplification wavelength band of the optical fiber amplifier has been expanding along with the advance in technology, thereby making it possible to amplify the WDM signals in a wider wavelength band of 1530 nm to 1610 nm (see, for example, A. Mori, et al., "1.5 $\mu m$ Broadband Amplification by Tellurite-Band EDFAs," OFC '97, PD1). In contrast, the zero-dispersion wavelength of the conventional dispersion-shifted optical fiber lies within the range of 1560nm to 1600 nm as mentioned above. Therefore, in a WDM transmission system employing the optical fiber amplifier having thus expanded amplification wavelength band and the conventional dispersion-shifted optical fiber, there is a possibility that the zero-dispersion wavelength of the conventional dispersion-shifted optical fiber may lie within the wavelength band that can be amplified by the optical fiber amplifier (the signal wavelength band of WDM signals), so that the four-wave mixing may occur strongly, whereby the WDM signals may not be transmitted normally.

In order to overcome the problems such as those mentioned above, it is an object of the present invention to provide a dispersion-shifted optical fiber suitable for an optical transmission line in which an optical fiber amplifier having an expanded amplification band is installed.

The dispersion-shifted optical fiber according to the present invention is a single-mode optical fiber comprising a core region extending along a predetermined axis, and a cladding region provided on the outer periphery of the core region; wherein a zero-dispersion wavelength is set within a range of 1610 nm or more but 1750 nm or less, preferably 1610 nm or more but 1670 nm or less, so that the optical fiber is employable in a WDM transmission system including an optical amplifier having an expanded amplification wavelength band. Particularly, in order to suppress the occurrence of nonlinear phenomena across a signal wavelength band by slightly generating a dispersion, the zero-dispersion wavelength is preferably set within a range of 1640 nm or more but 1750 nm or less, further preferably 1640 nm or more but 1670 nm or less. Also, the dispersion-shifted optical fiber according to the present invention has a cutoff wavelength of 1.1 $\mu$m or more at a length of 2 m and has, with respect to light having a wavelength of 1550 nm, which is light in a signal wavelength band, an effective area of 45 $\mu m^2$ or more, preferably 50 $\mu m^2$ or more, further preferably 70 $\mu m^2$ or more, and a dispersion slope of 0.15 ps/nm$^2$/km or less.

Since the dispersion-shifted optical fiber according to the present invention has an effective area of 45 $\mu m^2$ or more, preferably 50 $\mu m^2$ or more, further preferably 70 $\mu m^2$ or more, it can suppress nonlinear phenomena by the same extent as that of the conventional dispersion-shifted optical fiber or more. While the absolute value of dispersion value in a typical optical fiber having a zero-dispersion wavelength near 1.3 $\mu$m becomes about 20 ps/nm/km when employed in WDM transmission in a 1.5-$\mu$m wavelength band, a certain degree of transmission quality can be guaranteed by utilization of a dispersion compensating technique such as that mentioned above. Therefore, the dispersion-shifted optical fiber according to the present invention has a dispersion slope of 0.15 ps/nm$^2$/ km or less with respect to light a wavelength of 1550 nm so that the absolute value of dispersion value becomes 20 ps/nm/km or less. Further, in accordance with the specification of Bellcore, it is necessary that the bending loss upon bending at a diameter of 32 mm be 0.5 dB/turn or less. Therefore, the cutoff wavelength at a reference length of 2 m (measured by a method defined by ITU international standard) in the dispersion-shifted optical fiber according to the present invention is 1.1 $\mu$m or more so that the bending loss at a diameter of 32mm is 0.5 dB/turn or less. Here, the dispersion slope refers to the gradient of a graph indicating the wavelength dependence of dispersion value (see, for example, FIG. 5A).

This dispersion-shifted optical fiber is employable in a WDM transmission system together with an optical amplifier such as an optical fiber amplifier whose amplification wavelength band is expanded, for example, to the range of 1530 nm to 1610 nm. Namely, even in the case where the individual light signals included in the wavelength band of 1530 nm to 1610 nm that can be amplified by the optical fiber amplifier propagate through the dispersion-shifted optical fiber, the occurrence of nonlinear phenomena such as four-wave mixing, self phase modulation, and the like is suppressed. Also, since the dispersion-shifted optical fiber has an excellent bending characteristic, it can realize high-quality optical transmission.

For yielding various characteristics such as those mentioned above, the dispersion-shifted optical fiber according to the present invention can be realized by various refractive index profiles.

For example, a desirable refractive index profile can be realized when the above-mentioned core region is constituted by a center core having a predetermined refractive index and an outer core provided on the outer periphery of the center core and having a refractive index lower than that of the center core. In this configuration, the maximum value of relative refractive index difference of the center core with respect to a reference area in the cladding region is preferably 0.9% or more in view of its relationship with the zero dispersion wavelength.

Also, a desirable refractive index profile can be realized when the above-mentioned core region is constituted by a center core having a predetermined refractive index; an intermediate core provided on the outer periphery of the center core and having a refractive index lower than that of the center core; and, an outer core provided on the outer periphery of the intermediate core and having a refractive index higher than that of the intermediate core. In this configuration, the maximum value of relative refractive index difference of the center core with respect to the reference area in the cladding region is preferably 0.6% or more in view of its relationship with the zero dispersion wavelength.

Further, a desirable refractive index profile yielding the above-mentioned various characteristics can be realized when the above-mentioned core region is constituted by a center core having a predetermined refractive index and an outer core provided on the outer periphery of the center core and having a refractive index higher than that of the center core. In this configuration, the maximum value of relative refractive index difference of the outer core with respect to the reference area in the cladding region is preferably 0.8% or more in view of its relationship with the zero dispersion wavelength.

Here, the above-mentioned refractive index profile is represented by the relative refractive index difference $\Delta n_i$ given by the following expression (3):

$$\Delta n_i = (n_i - n_{cd})/n_{cd} \qquad (3)$$

where $n_{cd}$ is the refractive index of the reference area (SiO$_2$) in the cladding region, and $n_i$ is the refractive index of each part i constituting the core region. Hence,the relative refractive index difference $\Delta n_i$ is represented with reference to the average refractive index $n_{cd}$ of the reference area in the cladding region. In this specification, the relative refractive index difference is expressed in terms of percentage, and regions having a negative refractive index refer to those having a refractive index lower than that of the reference area.

Further, in the dispersion-shifted optical fiber according to the present invention, the cladding region can comprise a depressed cladding structure constituted by an inner cladding provided on the outer periphery of the core region, and an outer cladding provided on the outer periphery of the inner cladding and having a refractive index higher than that of the inner cladding. A combination of this depressed cladding structure and any of the core region structures mentioned above can realize a desirable refractive index profile. In the case of the depressed cladding structure, the above-mentioned relative refractive index difference is given while the above-mentioned outer cladding is employed as the reference area.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 5A is a graph showing the dispersion characteristic (wavelength dependence) of an optical fiber having a zero-dispersion wavelength near 1.3 $\mu$m, whereas

FIG. 15 is a table listing various characteristics of the dispersion-shifted optical fibers according to the first to tenth embodiments.

DETAILED DESCRIPTION OF THE PREFERRED EMBODIMENTS

In the following, individual embodiments of the dispersion-shifted optical fiber according to the present invention will be explained with reference to FIGS. 1 to 4, 5A, 5B, and 6 to 15. In the explanation of the drawings, constituents identical to each other will be referred to with numerals or letters identical to each other without repeating their overlapping descriptions.

Figure 1:
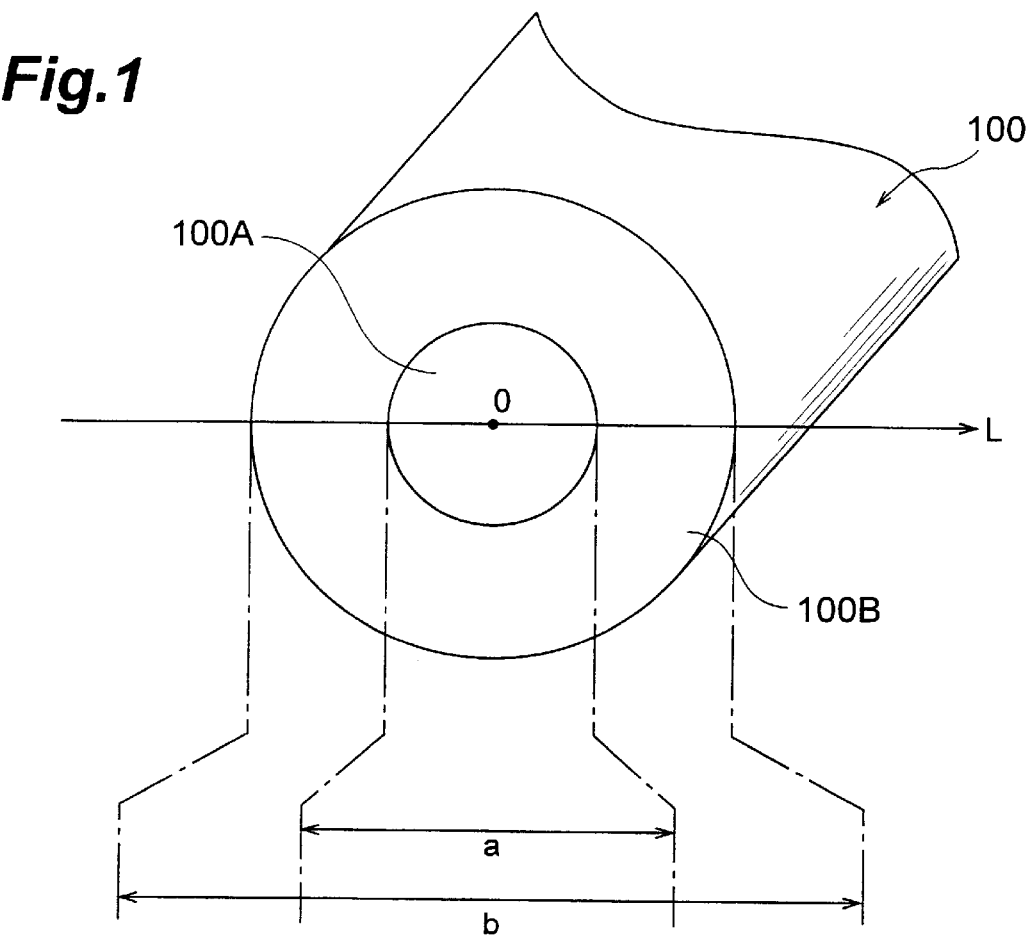
FIG. 1 is a view showing a schematic structure of a cross section of a dispersion-shifted optical fiber according to the present invention.

As shown in FIG. 1, a dispersion-shifted optical fiber 100 according to the present invention is a single-mode optical fiber which comprises a core region 100A extending along a predetermined axis and having an outside diameter a, and a cladding region 100B provided on the outer periphery of the core region 100A and having an outside diameter b, and has a zero-dispersion wavelength set to 1610 nm or more but 1750 nm or less. This dispersion-shifted optical fiber 100 has a cutoff wavelength of 1.1 $\mu$m or more at a reference length of 2 m (according to the ITU international standard) and has, with respect to light having a wavelength of 1550 nm, an effective area of 45 $\mu$m$^2$ or more, preferably 50 $\mu$m$^2$ or more, further preferably 70 $\mu$m$^2$ or more, and a dispersion slope of 0.15 ps/nm$^2$/km or less. As shown in first to tenth embodiments which will be mentioned later, each of the above-mentioned core region 100A and cladding region 100B can be constituted by a plurality of glass areas having refractive indices different from each other.

The zero-dispersion wavelength of the dispersion-shifted optical fiber 100 according to the present invention is set outside the wavelength band of 1530 nm to 1610 nm, in which each light signal can be amplified when an optical fiber amplifier having an expanded amplification wavelength band is employed in a WDM transmission system, and on the longer wavelength band side from this amplification wavelength band. Therefore, the occurrence of four-wave mixing is effectively suppressed. Also, since the upper limit of the zero-dispersion wavelength of the dispersion-shifted optical fiber 100 is 1670 nm, whereas the upper limit of its dispersion slope is 0.15 ps/nm$^2$/km (0.09 ps/nm$^2$/km when the upper limit of the zero-dispersion wavelength of the dispersion-shifted optical fiber 100 is 1750 nm), the absolute value of dispersion of the dispersion-shifted optical fiber 100 can be suppressed to 21 ps/nm/km or less in the amplification wavelength band of the optical fiber, 1530 nm to 1610 nm, because of the reason that will be mentioned later. As a consequence, the interaction between the self phase modulation and the dispersion of the dispersion-shifted optical fiber 100 can sufficiently be lowered by a dispersion-compensating technique. Also, since the effective area is 45 $\mu$m$^2$ or more, preferably 50 $\mu$m$^2$ or more, further preferably 70 $\mu$m$^2$ or more, the power density of each light signal propagating through the dispersion-shifted optical fiber 100 is kept low, whereby the occurrence of nonlinear phenomena is suppressed. Further, since the cutoff wavelength at 2 m is 1.1 $\mu$m or more, this dispersion-shifted optical fiber has an excellent bending characteristic. Therefore, WDM transmission systems employing the dispersion shifted optical fiber 100 according to the present invention enable high-quality optical transmissions even when an optical fiber amplifier having an expanded amplification wavelength band is employed therein.

Ten embodiments of the dispersion-shifted optical fiber 100 according to the present invention will now be explained. Here, each of the dispersion-shifted optical fibers according to the first and second embodiments has a refractive index profile of a double core structure. Each of the dispersion-shifted optical fibers according to the third to fifth embodiments has a multilayer core structure. Each of the dispersion-shifted optical fibers according to the sixth and seventh embodiments has a ring core structure. The dispersion-shifted optical fiber according to the eighth embodiment has a refractive index profile in which a depressed cladding structure and a ring core structure are combined together. The dispersion-shifted optical fiber according to the ninth embodiment has a refractive index profile of a double ring core structure. The dispersion-shifted optical fiber according to the tenth embodiment has a refractive index profile of a multilayer core structure.

First Embodiment

Figure 2:
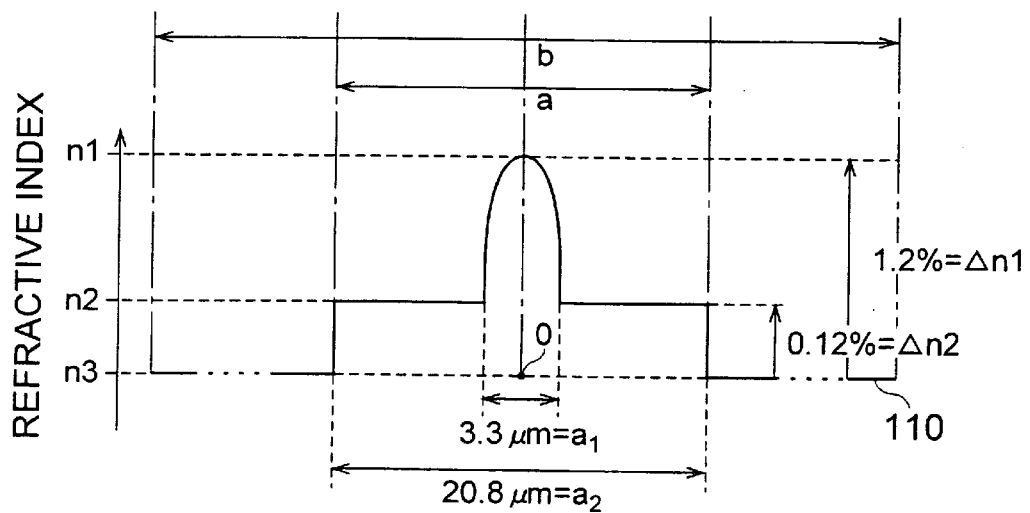
FIG. 2 is a view showing the refractive index profile in a first embodiment of the dispersion-shifted optical fiber according to the present invention.

FIG. 2 is a view showing the refractive index profile of the dispersion-shifted optical fiber according to the first embodiment. This refractive index profile 110 corresponds to the refractive index of each part on a line L passing the center axis O of the dispersion-shifted optical fiber 100 shown in FIG. 1.

As with the dispersion-shifted optical fiber 100 shown in FIG. 1, the dispersion-shifted optical fiber according to the first embodiment comprises a core region having an outside diameter a and a cladding region having an outside diameter b. The core region (corresponding to the core region 100A in FIG. 1) has a double core structure constituted by a center core having a maximum refractive index $n_1$ and an outer core provided so as to surround the outer periphery of the center core and having a refractive index $n_2$ ($<n_1$). The cladding region (corresponding to the cladding region 100B in FIG. 1), which is provided so as to surround the outer periphery of the core region, has a refractive index $n_3$ ($<n_2$), whereby the respective refractive indices of the individual regions have the relationship in terms of magnitude of $n_3<n_2<n_1$.

The outside diameter $a_1$ of the center core is 3.3 $\mu$m, the outside diameter $a_2$ (equal to the outside diameter a of the core region) of the outer core surrounding the center core is 20.8 $\mu$m, and the outside diameter b of the cladding region surrounding the outer core is 125 $\mu$m. The relative refractive index difference of each region is given by expression (3) while the cladding region having the refractive index $n_3$ is employed as the reference area, whereby the maximum value $\Delta n_1$ of relative refractive index difference of the center core with respect to the cladding region is +1.2%, and the relative refractive index difference $\Delta n_2$ of the outer core with respect to the cladding region is +0.12%.

Upon measurement of various characteristics of the dispersion-shifted optical fiber according to the first embodiment, the zero-dispersion wavelength and the cutoff wavelength at a length of 2 m were 1645 nm and 1.46 $\mu$m, respectively. Also, with respect to light having a wavelength of 1550 nm, the effective area, the dispersion slope, the dispersion and the bending loss at a diameter of 32 mm were 56 $\mu m^2$, 0.13 $ps/nm^2/km$, −12.2 ps/nm/km and 0.01 dB/turn, respectively.

Figure 3:
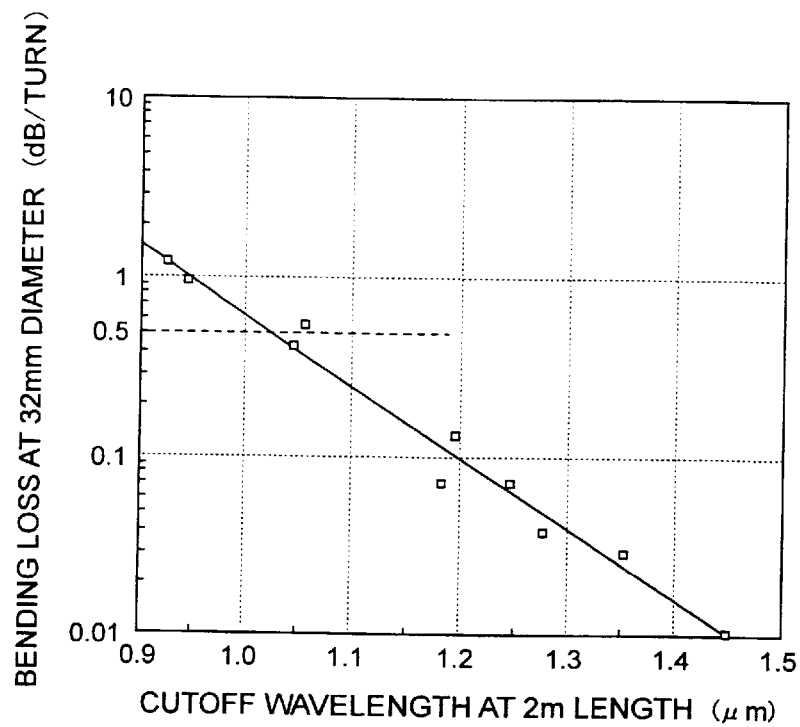
FIG. 3 is a graph showing the relationship between bending loss and cutoff wavelength in the dispersion-shifted optical fiber according to the first embodiment.

FIG. 3 is a graph showing the relationship between the bending loss (dB/turn) at a diameter of 32 mm and the cutoff wavelength ($\mu$m) at a length of 2 m in the dispersion-shifted optical fiber according to the present invention. This graph is the result of measurement in the state where the effective area and zero-dispersion wavelength were set within the ranges of 53±3 $\mu m^2$ and 1645±20 nm, respectively, showing the relationship between the cutoff wavelength and bending loss when the cutoff wavelength was successively changed as the shape of refractive index profile shown in FIG. 2 was slightly altered.

For example, the bending loss at a diameter of 32 mm is 0.5 dB/turn or less according to the specification proposed by Bellcore. Therefore, in order to satisfy the specification of Bellcore, it is necessary for the cutoff wavelength at a length of 2 m to be 1.1 $\mu$m or more as can be seen from FIG. 3. Here, the bending loss is expressed in terms of the value per turn of the transmission loss measured when a plurality of turns of the optical fiber to be measured are wound about a mandrel having a diameter of 32 mm.

Figure 4:
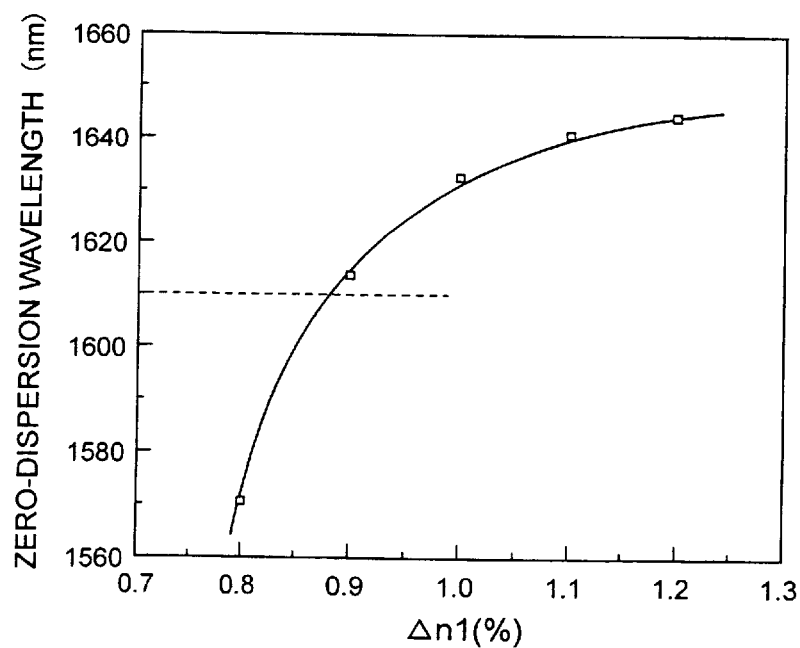
FIG. 4 is a graph showing the relationship between the zero-dispersion wavelength and the relative refractive index difference of the center core in the dispersion-shifted optical fiber according to the first embodiment.

In general, while the dispersion characteristic of the optical fiber is expressed by the sum of material dispersion and waveguide dispersion (structural dispersion), it has been known that, when the material dispersion is taken into account, the zero-dispersion wavelength shifts toward the longer wavelength side as a greater amount of $GeO_2$ is included. Therefore, the zero-dispersion wavelength can easily be shifted toward the longer wavelength side if the $GeO_2$ concentration is made higher in an area with a higher optical power (e.g., the center core in the case of a double core structure or the outer core in the case of a ring core structure), i.e., if the relative refractive index difference of this area with respect to the cladding region (reference area) is made greater. FIG. 4 is a graph showing the relationship between the zero-dispersion wavelength and the relative refractive index difference of the area having the highest refractive index (the center core in the first embodiment) in the dispersion-shifted optical fiber according to the first embodiment. This graph shows the change in zero-dispersion wavelength when the relative refractive index difference $\Delta n_2$ of the outer core (refractive index $n_2$) with respect to the cladding region (refractive index $n_3$) acting as the reference area (given by expression (3)), and the ratio ($a_1/a_2$) of the outside diameter $a_1$ of the center core to the outside diameter $a_2$ of the outer core in the core region are held constant. However, the outside diameter $a_2$ of the outer core is changed such that the effective area becomes 56 $\mu m^2$.

As can also be seen from the graph of FIG. 4, the maximum value $\Delta n_1$ of relative refractive index difference of the center core with respect to the cladding region is needed to be 0.9% or more in the first embodiment in order to set the zero-dispersion wavelength to 1610 nm or more.

Figure 5A:
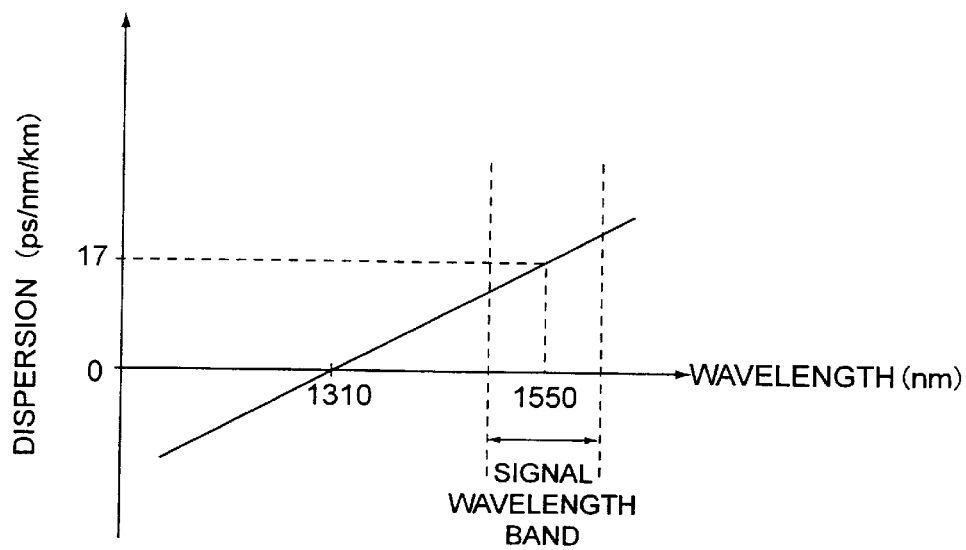
Figure 5B:
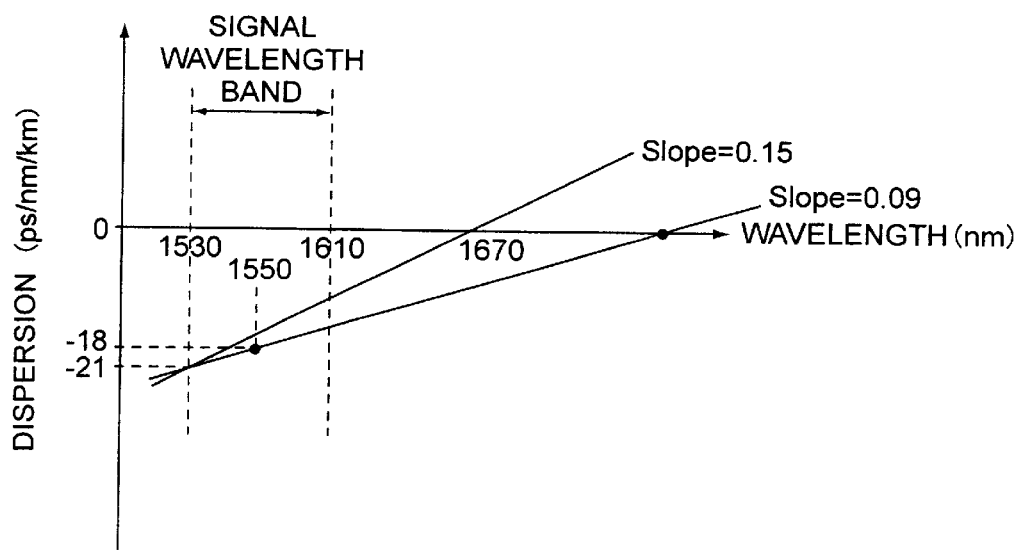
FIG. 5B is a graph showing the dispersion characteristic (wavelength dependence) of the dispersion-shifted optical fiber according to the present invention.

While a typical optical fiber (optical fiber for light signals in the 1.3-$\mu$m band) has a zero-dispersion wavelength which is set near 1310 nm, it can also transmit light signals in the 1.5-$\mu$m band by utilizing the above-mentioned dispersion-compensating technique. In this case, while a dispersion of about +17 ps/nm/km occurs with respect to light signals in the 1.5-$\mu$m band in this typical optical fiber (see FIG. 5A), there will conversely be no practical problems if the absolute value of dispersion value is suppressed to this level. If this theory is applied to the dispersion-shifted optical fiber according to this embodiment, then it can be seen that, as shown in FIG. 5B, a sufficient transmission quality is secured when the dispersion slope is set to 0.15 $ps/nm^2/km$ or less, preferably 0.09 $ps/nm^2/km$ or less (about −21 ps/nm/km at the maximum in the signal wavelength band in this embodiment) even in the case where the zero-dispersion wavelength is set on the longer wavelength side from the signal wavelength band.

Second Embodiment

Figure 6:
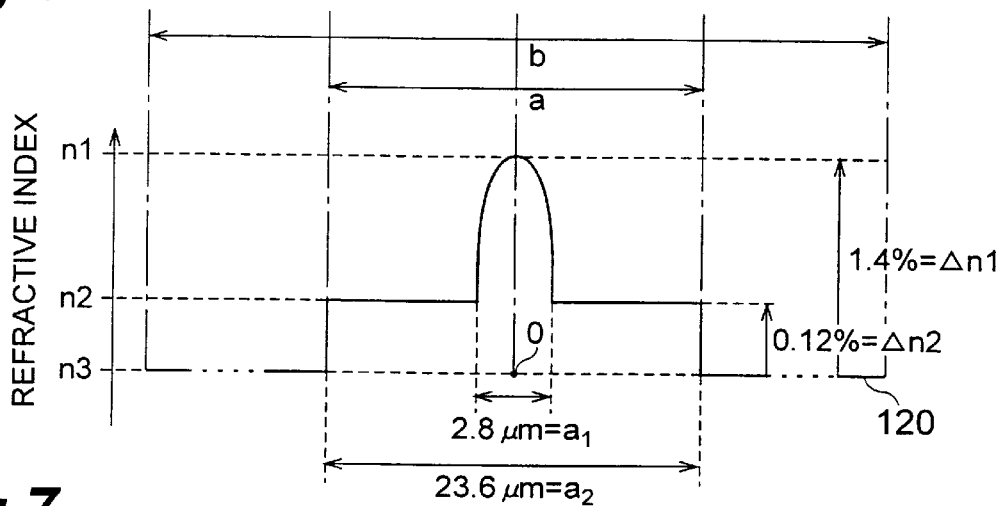
FIG. 6 is a view showing the refractive index profile in a second embodiment of the dispersion-shifted optical fiber according to the present invention.

FIG. 6 is a view showing the refractive index profile of the dispersion-shifted optical fiber according to the second embodiment. This refractive index profile 120 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the second embodiment comprises a core region having an outside diameter a and a cladding region having an outside diameter b. The core region (corresponding to the core region 100A in FIG. 1) has a double core structure constituted by a center core having a maximum refractive index $n_1$ and an outer core provided so as to surround the outer periphery of the center core and having a refractive index $n_2$ ($<n_1$). The cladding region (corresponding to the cladding region 100B in FIG. 1), which is provided so as to surround the outer periphery of the core region, has a refractive index $n_3$ ($<n_2$), whereby the respective refractive indices of the individual regions have the relationship in terms of magnitude of $n_3<n_2<n_1$.

The outside diameter $a_1$ of the center core is 2.8 µm, the outside diameter $a_2$ (equal to the outside diameter a of the core region) of the outer core surrounding the center core is 23.6 µm, and the outside diameter b of the cladding region surrounding the outer core is 125 µm. The relative refractive index difference of each region is given by expression (3) while the cladding region having the refractive index $n_3$ is employed as the reference area, whereby the maximum value $\Delta n_1$ of relative refractive index difference of the center core with respect to the cladding region is +1.4%, and the relative refractive index difference $\Delta n_2$ of the outer core with respect to the cladding region is +0.12%.

Upon measurement of various characteristics of the dispersion-shifted optical fiber according to the second embodiment, the zero-dispersion wavelength and the cutoff wavelength at a length of 2 m were 1628 nm and 1.59 µm, respectively. Also, with respect to light having a wavelength of 1550 nm, the effective area, the dispersion slope, the dispersion and the bending loss at a diameter of 32 mm were 71 µm$^2$, 0.14 ps/nm$^2$/km −11.9 ps/nm/km and 0.12 dB/turn, respectively.

Third Embodiment

Figure 7:
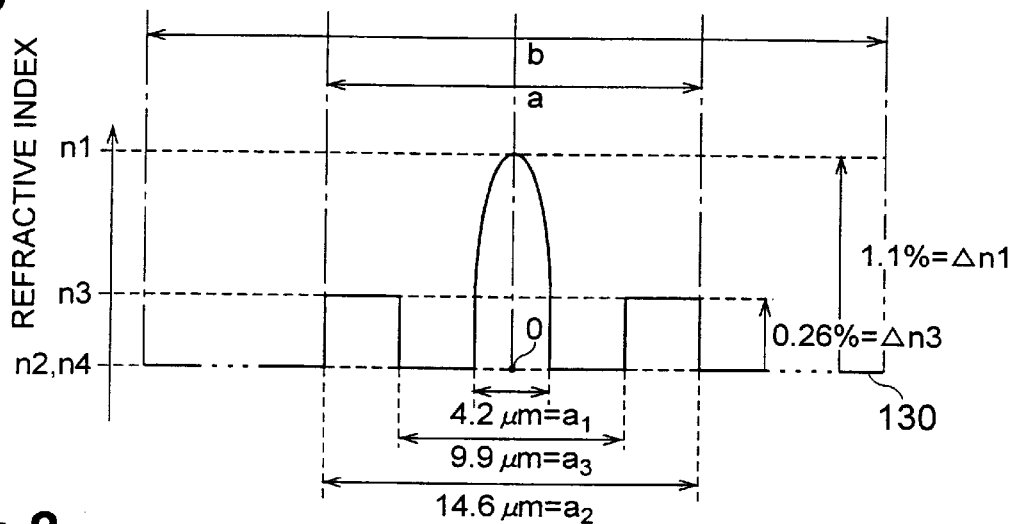
FIG. 7 is a view showing the refractive index profile in a third embodiment of the dispersion-shifted optical fiber according to the present invention.

FIG. 7 is a view showing the refractive index profile of the dispersion-shifted optical fiber according to the third embodiment. This refractive index profile 130 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the third embodiment comprises a core region having an outside diameter a and a cladding region having an outside diameter b. The core region (corresponding to the core region 100A in FIG. 1) has a multilayer core structure constituted by a center core having a maximum refractive index $n_1$; an intermediate core provided so as to surround the outer periphery of the center core and having a refractive index $n_2$ ($<n_1$); and an outer core provided so as to surround the outer periphery of the intermediate core and having a refractive index $n_3$ ($>n_2$, $<n_1$). The cladding region (corresponding to the cladding region 100B in FIG. 1), which is provided so as to surround the outer periphery of the core region, has a refractive index $n_4$ ($=n_2$), whereby the respective refractive indices of the individual regions have the relationship in terms of magnitude of $n_2=n_4<n_3<n_1$. It is not always necessary for the refractive index $n_2$ of the intermediate core and the refractive index $n_4$ of the cladding region to coincide with each other.

The outside diameter $a_1$ of the center core is 4.2 µm, the outside diameter $a_2$ (equal to the outside diameter a of the core region) of the outer core surrounding the center core is 14.6 µm, the outside diameter $a_3$ of the intermediate core positioned between the center core and the outer core is 9.9 µm, and the outside diameter b of the cladding region surrounding the outer core is 125 µm. The relative refractive index difference of each region is given by expression (3) while the cladding region having the refractive index $n_4$ is employed as the reference area, whereby the maximum value $\Delta n_1$ of relative refractive index difference of the center core with respect to the cladding region is +1.1%, and the relative refractive index difference $\Delta n_3$ of the outer core with respect to the cladding region is +0.26%.

Upon measurement of various characteristics of the dispersion-shifted optical fiber according to the third embodiment, the zero-dispersion wavelength and the cutoff wavelength at a length of 2 m were 1654 nm and 1.35 µm, respectively. Also, with respect to light having a wavelength of 1550 nm, the effective area, the dispersion slope, the dispersion and the bending loss at a diameter of 32 mm were 57 µm$^2$, 0.15 ps/nm$^2$/km, −15.2 ps/nm/km and 0.08 dB/turn, respectively.

Fourth Embodiment

Figure 8:
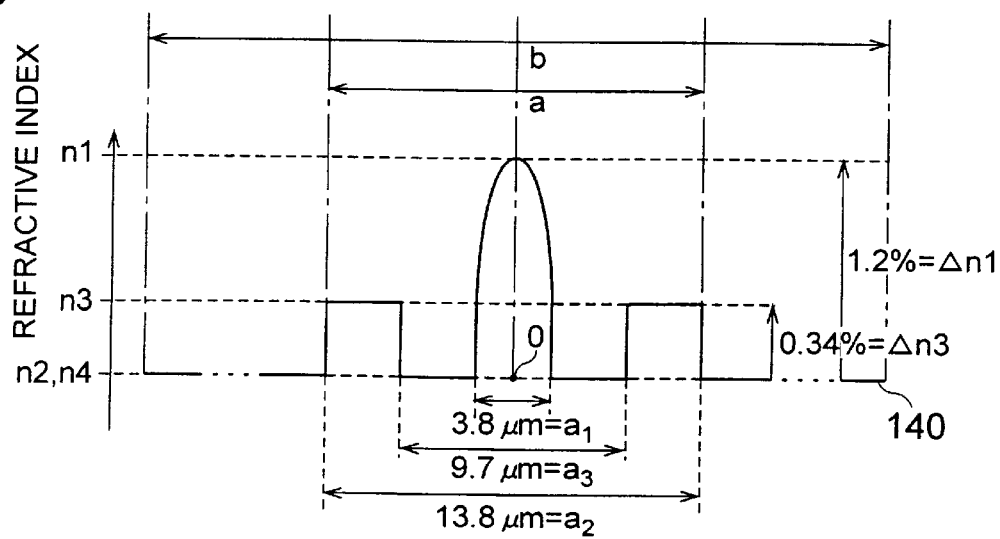
FIG. 8 is a view showing the refractive index profile in a fourth embodiment of the dispersion-shifted optical fiber according to the present invention.

FIG. 8 is a view showing the refractive index profile of the dispersion-shifted optical fiber according to the fourth embodiment. This refractive index profile 140 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the fourth embodiment comprises a core region having an outside diameter a and a cladding region having an outside diameter b. The core region (corresponding to the core region 100A in FIG. 1) has a multilayer core structure constituted by a center core having a maximum refractive index $n_1$; an intermediate core provided so as to surround the outer periphery of the center core and having a refractive index $n_2$ ($<n_1$); and an outer core provided so as to surround the outer periphery of the intermediate core and having a refractive index $n_3$ ($>n_2$, $<n_1$). The cladding region (corresponding to the cladding region 100B in FIG. 1), which is provided so as to surround the outer periphery of the core region, has a refractive index $n_4$ ($=n_2$), whereby the respective refractive indices of the individual regions have the relationship in terms of magnitude of $n_2=n_4<n_3<n_1$. It is not always necessary for the refractive index $n_2$ of the intermediate core and the refractive index $n_4$ of the cladding region to coincide with each other.

The outside diameter $a_1$ of the center core is 3.8 µm, the outside diameter $a_2$ (equal to the outside diameter a of the core region) of the outer core surrounding the center core is 13.8 µm, the outside diameter $a_3$ of the intermediate core positioned between the center core and the outer core is 9.7 µm, and the outside diameter b of the cladding region surrounding the outer core is 125 µm. The relative refractive index difference of each region is given by expression (3) while the cladding region having the refractive index $n_4$ is employed as the reference area, whereby the maximum value $\Delta n_1$ of relative refractive index difference of the center core with respect to the cladding region is +1.2%, and the relative refractive index difference $\Delta n_3$ of the outer core with respect to the cladding region is +0.34%.

Upon measurement of various characteristics of the dispersion-shifted optical fiber according to the fourth embodiment, the zero-dispersion wavelength and the cutoff wavelength at a length of 2 m were 1624 nm and 1.45 µm, respectively. Also, with respect to light having a wavelength of 1550 nm, the effective area, the dispersion slope, the dispersion and the bending loss at a diameter of 32 mm were 71 µm$^2$, 0.15 ps/nm$^2$/km, -12.5 ps/nm/km and 0.13 dB/turn, respectively.

Fifth Embodiment

Figure 9:
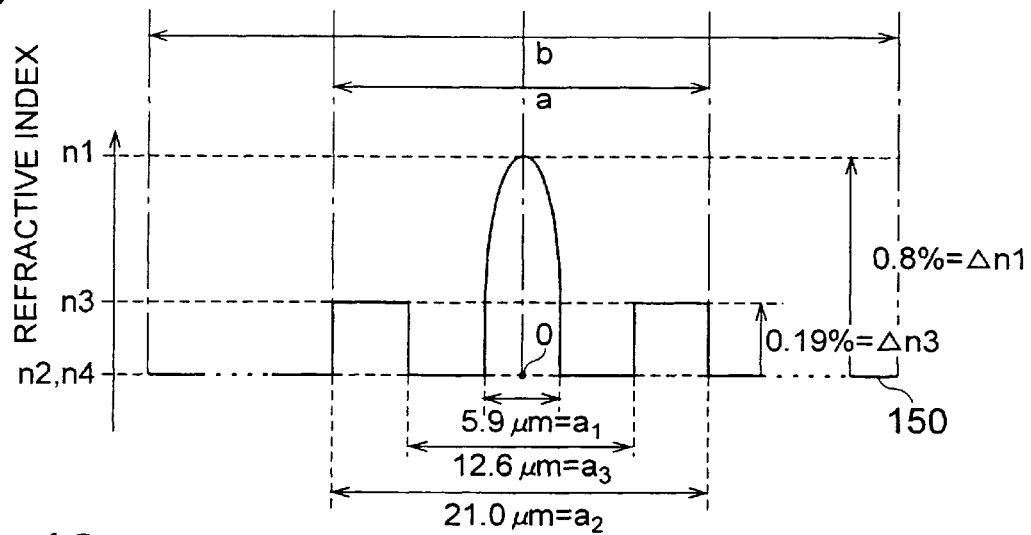
FIG. 9 is a view showing the refractive index profile in a fifth embodiment of the dispersion-shifted optical fiber according to the present invention.

FIG. 9 is a view showing the refractive index profile of the dispersion-shifted optical fiber according to the fifth embodiment. This refractive index profile 150 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the fifth embodiment comprises a core region having an outside diameter a and a cladding region having an outside diameter b. The core region (corresponding to the core region 100A in FIG. 1) has a multilayer core structure constituted by a center core having a maximum refractive index $n_1$; an intermediate core provided so as to surround the outer periphery of the center core and having a refractive index $n_2$ (<$n_1$); and an outer core provided so as to surround the outer periphery of the intermediate core and having a refractive index $n_3$ (>$n_2$, <$n_1$). The cladding region (corresponding to the cladding region 100B in FIG. 1), which is provided so as to surround the outer periphery of the core region, has a refractive index $n_4$ (=$n_2$), whereby the respective refractive indices of the individual regions have the relationship in terms of magnitude of $n_2$=$n_4$<$n_3$<$n_1$. It is not always necessary for the refractive index $n_2$ of the intermediate core and the refractive index $n_4$ of the cladding region to coincide with each other.

The outside diameter $a_1$ of the center core is 5.9 µm, the outside diameter $a_2$ (equal to the outside diameter a of the core region) of the outer core surrounding the center core is 21.0 µm, the outside diameter $a_3$ of the intermediate core positioned between the center core and the outer core is 12.6 µm, and the outside diameter b of the cladding region surrounding the outer core is 125 µm. The relative refractive index difference of each region is given by expression (3) while the cladding region having the refractive index $n_4$ is employed as the reference area, whereby the maximum value $\Delta n_1$ of relative refractive index difference of the center core with respect to the cladding region is +0.8%, and the relative refractive index difference $\Delta n_3$ of the outer core with respect to the cladding region is +0.19%.

Upon measurement of various characteristics of the dispersion-shifted optical fiber according to the fifth embodiment, the zero-dispersion wavelength and the cutoff wavelength at a length of 2 m were 1653 nm and 1.68 µm, respectively. Also, with respect to light having a wavelength of 1550 nm, the effective area, the dispersion slope, the dispersion and the bending loss at a diameter of 32 mm were 56 µm$^2$, 0.08 ps/nm$^2$/km, -9.1 ps/nm/km and 0.03 dB/turn, respectively.

Sixth Embodiment

Figure 10:
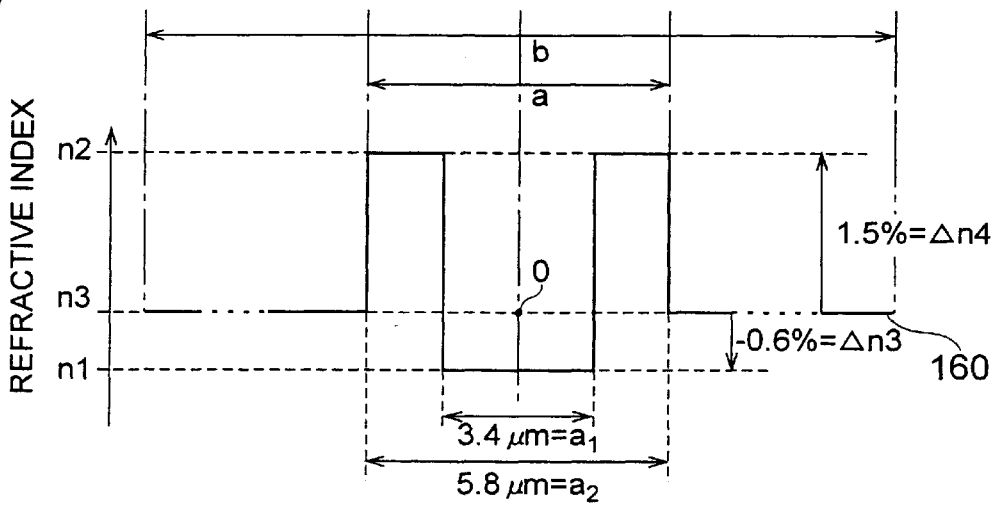
FIG. 10 is a view showing the refractive index profile in a sixth embodiment of the dispersion-shifted optical fiber according to the present invention.

FIG. 10 is a view showing the refractive index profile of the dispersion-shifted optic al fiber according to the sixth embodiment. This refractive index profile 160 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the sixth embodiment comprise a core region having an outside diameter a and a cladding region having an outside diameter b. The core region (corresponding to the core region 100A in FIG. 1) has a ring core structure constituted by a center core having a refractive index $n_1$ and an outer core provided so as to surround the outer periphery of the center core and having a refractive index $n_2$ (>$n_1$). The cladding region (corresponding to the cladding region 100B in FIG. 1), which is provided so as to surround the outer periphery of the core region, has a refractive index $n_3$ (>$n_1$, <$n_2$), whereby the respective refractive indices of the individual regions have the relationship in terms of magnitude of $n_1$<$n_3$<$n_2$.

The outside diameter $a_1$ of the center core is 3.4 µm, the outside diameter $a_2$ (equal to the outside diameter a of the core region) of the outer core surrounding the center core is 5.8 µm, and the outside diameter b of the cladding region surrounding the outer core is 125 µm. The relative refractive index difference of each region is given by expression (3) while the cladding region having the refractive index $n_3$ is employed as the reference area, whereby the relative refractive index difference $\Delta n_3$ of the center core with respect to the cladding region is -0.6%, and the maximum value $\Delta n_4$ of relative refractive index difference of the outer core with respect to the cladding region is +1.5%.

Upon measurement of various characteristics of the dispersion-shifted optical fiber according to the sixth embodiment, the zero-dispersion wavelength and the cutoff wavelength at a length of 2 m were 1634 nm and 1.58 µm, respectively. Also, with respect to light having a wavelength of 1550 nm, the effective area, the dispersion slope, the dispersion and the bending loss at a diameter of 32 mm were 53 µm$^2$, 0.09 ps/nm$^2$/km, -7.7 ps/nm/km and 5×10$^{-10}$ dB/turn, respectively.

Seventh Embodiment

Figure 11:
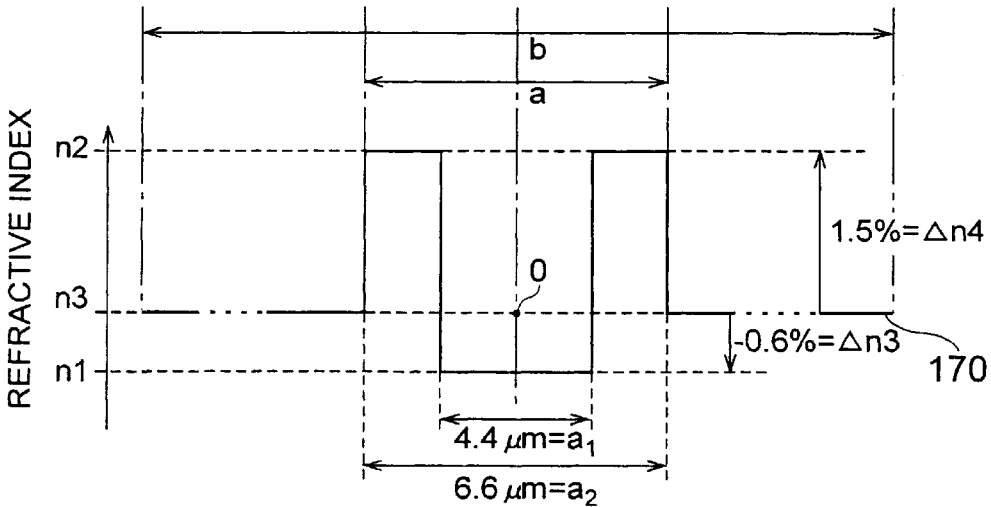
FIG. 11 is a view showing the refractive index profile in a seventh embodiment of the dispersion-shifted optical fiber according to the present invention.

FIG. 11 is a view showing the refractive index profile of the dispersion-shifted optical fiber according to the seventh embodiment. This refractive index profile 170 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the seventh embodiment comprises a core region having an outside diameter a and a cladding region having an outside diameter b. The core region (corresponding to the core region 100A in FIG. 1) has a ring core structure constituted by a center core having a refractive index $n_1$ and an outer core provided so as to surround the outer periphery of the center core and having a refractive index $n_2$ (>$n_1$). The cladding region (corresponding to the cladding region 100B in FIG. 1), which is provided so as to surround the outer periphery of the core region, has a refractive index $n_3$ (>$n_1$, <$n_2$), whereby the respective refractive indices of the individual regions have the relationship in terms of magnitude of $n_1$<$n_3$<$n_2$.

The outside diameter $a_1$ of the center core is 4.4 µm, the outside diameter $a_2$ (equal to the outside diameter a of the core region) of the outer core surrounding the center core is 6.6 µm, and the outside diameter b of the cladding region surrounding the outer core is 125 µm. The relative refractive index difference of each region is given by expression (3) while the cladding region having the refractive index $n_3$ is employed as the reference area, whereby the relative refractive index difference $\Delta n_3$ of the center core with respect to the cladding region is -0.6%, and the maximum value $\Delta n_4$ of relative refractive index difference of the outer core with respect to the cladding region is +1.5%.

Upon measurement of various characteristics of the dispersion-shifted optical fiber according to the seventh embodiment, the zero-dispersion wavelength and the cutoff wavelength at a length of 2 m were 1658 nm and 1.60 µm, respectively. Also, with respect to light having a wavelength of 1550 nm, the effective area, the dispersion slope, the dispersion and the bending loss at a diameter of 32 mm were 73 µm², 0.09 ps/nm²/km, −10.4 ps/nm/km and 3×10⁻⁵ dB/turn, respectively.

Eighth Embodiment

Figure 12:
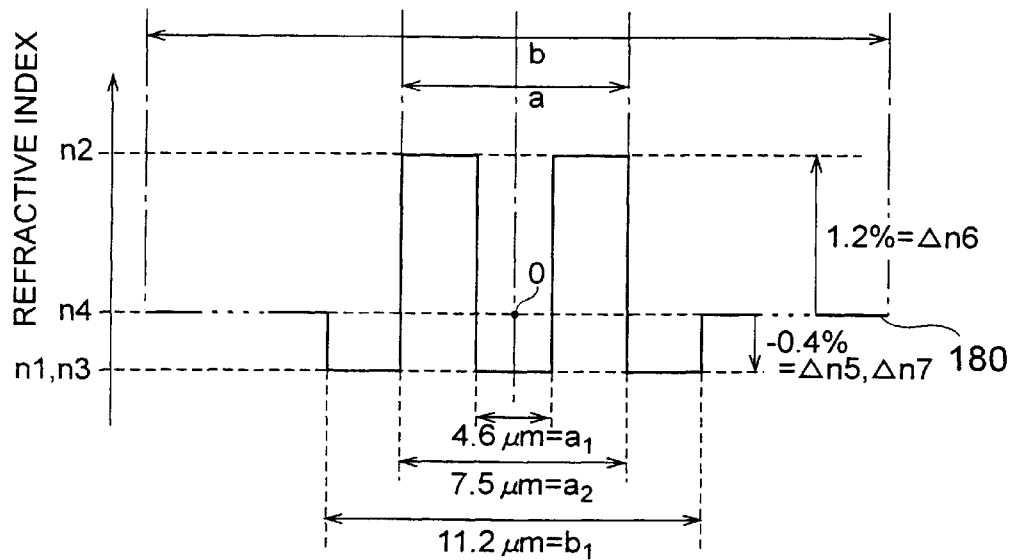
FIG. 12 is a view showing the refractive index profile in an eighth embodiment of the dispersion-shifted optical fiber according to the present invention.

FIG. 12 is a view showing the refractive index profile of the dispersion-shifted optical fiber according to the eighth embodiment. This refractive index profile 180 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the eighth embodiment comprises a core region having an outside diameter a and a cladding region having an outside diameter b. The core region (corresponding to the core region 100A in FIG. 1) has a ring core structure constituted by a center core having a refractive index $n_1$ and an outer core provided so as to surround the outer periphery of the center core and having a refractive index $n_2$ ($>n_1$). The cladding region (corresponding to the cladding region 100B in FIG. 1), which is provided so as to surround the outer periphery of the core region, has a depressed cladding structure constituted by an inner cladding provided so as to surround the outer periphery of the outer core and having a refractive index $n_3$ ($=n_1$), and an outer cladding provided so as to surround the outer periphery of the inner cladding and having a refractive index $n_4$ ($>n_3$, $<n_2$). As a consequence, the respective refractive indices of the individual regions have the relationship in terms of magnitude of $n_1 n_3 < n_4 < n_2$. It is not always necessary for the refractive index $n_1$ of the center core and the refractive index $n_3$ of the inner cladding to coincide with each other.

The outside diameter $a_1$ of the center core is 4.6 µm, whereas the outside diameter $a_2$ (equal to the outside diameter a of the core region) of the outer core surrounding the center core is 7.5 µm. On the other hand, the outside diameter $b_1$ of the inner cladding surrounding the outer core is 11.2 µm, whereas the outside diameter b of the whole cladding region (equal to the outside diameter of the outer cladding) is 125 µm. The relative refractive index difference of each region by expression (3) while the outer cladding having the refractive index $n_4$ is employed as the reference area, whereby the relative refractive index difference $\Delta n_5$ of the center core with respect to the outer cladding is −0.4%, the maximum value $\Delta n_6$ of relative refractive index difference of the outer core with respect to the outer cladding region is +1.2%, and the relative refractive index difference $\Delta n_7$ f the inner cladding with respect to the outer cladding is −0.4%.

Upon measurement of various characteristics of the dispersion-shifted optical fiber according to the eighth embodiment, the zero-dispersion wavelength and the cutoff wavelength at a length of 2 m were 1663 nm and 1.52 µm, respectively. Also, with respect to light having a wavelength of 1550 nm, the effective area, the dispersion slope, the dispersion and the bending loss at a diameter of 32 mm were 70 µm², 0.08 ps/nm²/km, −9.0 ps/nm/km and 4×10⁻⁴ dB/turn, respectively.

Ninth Embodiment

Figure 13:
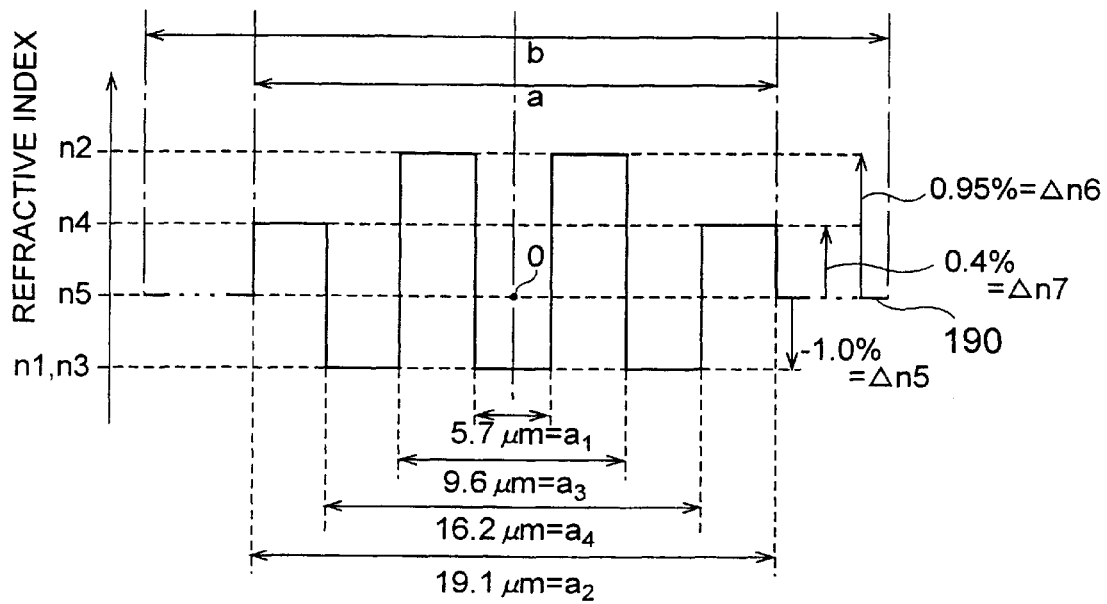
FIG. 13 is a view showing the refractive index profile in a ninth embodiment of the dispersion-shifted optical fiber according to the present invention.

FIG. 13 is a view showing the refractive index profile of the dispersion-shifted optical fiber according to the ninth embodiment. This refractive index profile 190 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the ninth embodiment comprises a core region having an outside diameter a and a cladding region having an outside diameter b. The core region (corresponding to the core region 100A in FIG. 1) has a ring core structure constituted by a center core having a refractive index $n_1$; a first intermediate core provided so as to surround the outer periphery of the center core and having a refractive index $n_2$ ($>n_1$), a second intermediate core provided so as to surround the outer periphery of the first intermediate core and having a refractive index $n_3$ ($=n_1$), and an outer core provided so as to surround the outer periphery of the second intermediate core and having a refractive index $n_4$ ($>n_3$, $<n_2$). The cladding region (corresponding to the cladding region 100B in FIG. 1), which is provided so as to surround the outer periphery of the core region, has a refractive index $n_5$ ($>n_3$, $<n_4$). As a consequence, the respective refractive indices of the individual regions have the relationship in terms of magnitude of $n_1 = n_3 < n_5 < n_4 < n_2$. It is not always necessary for the refractive index $n_1$ of the center core and the refractive index $n_3$ of the second intermediate core to coincide with each other.

The outside diameter $a_1$ of the center core is 5.7 µm, the outside diameter $a_2$ (equal to the outside diameter a of the core region) of the outer core surrounding the center core is 19.1 µm, the outside diameter $a_3$ of the first intermediate core provided between the center core and the outer core is 9.6 µm, and the outside diameter $a_4$ of the second intermediate core provided between the first intermediate core and the outer core is 16.2 µm. On the other hand, the outside diameter of the cladding surrounding the outer core is 125 µm. The relative refractive index difference of each region is given by expression (3) while the cladding region having the refractive index $n_5$ is employed as the reference area, whereby the relative refractive index difference $\Delta n_5$ of the center core and second intermediate core with respect to the cladding region is −1.0%, the maximum value $\Delta n_6$ of relative refractive index difference of the first intermediate core with respect to the cladding region is +0.95%, and the relative refractive index difference $\Delta n_7$ of the outer cladding with respect to the cladding region is +0.4%.

Upon measurement of various characteristics of the dispersion-shifted optical fiber according to the ninth embodiment, the zero-dispersion wavelength and the cutoff wavelength at a length of 2 m were 1625 nm and 1.68 µm, respectively. Also, with respect to light having a wavelength of 1550 nm, the effective area, the dispersion slope, the dispersion and the bending loss at a diameter of 32 mm were 94 µm², 0.07 ps/nm²/km, −4.9 ps/nm/km and 4×10⁻⁴ dB/turn, respectively.

Tenth Embodiment

Figure 14:
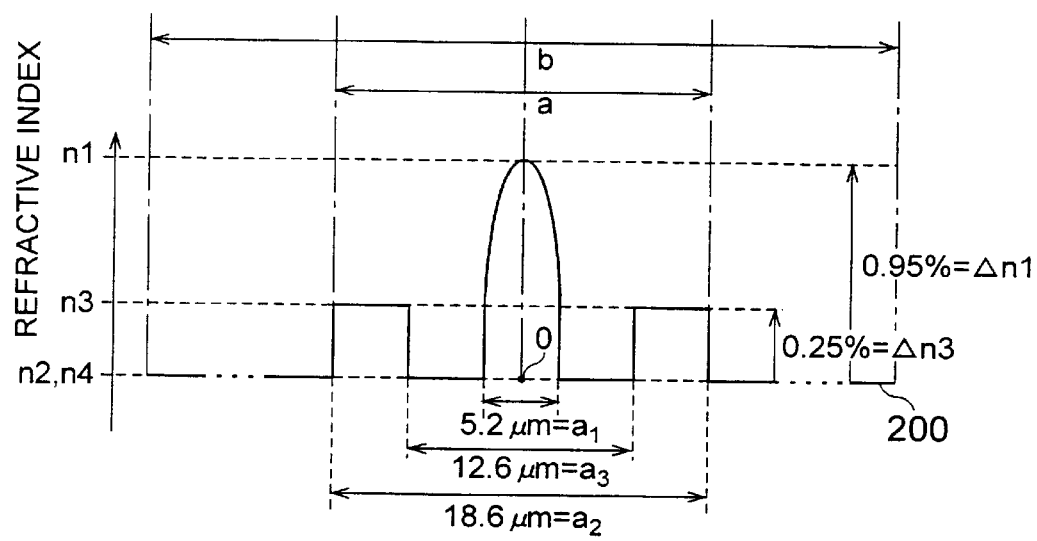
FIG. 14 is a view showing the refractive index profile in a tenth embodiment of the dispersion-shifted optical fiber according to present invention.

FIG. 14 is a view showing the refractive index profile of the dispersion-shifted optical fiber according to the tenth embodiment. This refractive index profile 200 corresponds to the refractive index of each part on the line L passing the center axis O of the dispersion-shifted optical fiber 100 shown in FIG. 1.

As with the dispersion-shifted optical fiber 100 shown in FIG. 1, the dispersion-shifted optical fiber according to the tenth embodiment comprises a core region having an outside diameter a and a cladding region having an outside diameter b. The core region (corresponding to the core region 100A in FIG. 1) has a multilayer core structure constituted by a center core having a maximum refractive index $n_1$; an intermediate core provided so as to surround the outer periphery of the center core and having a refractive index $n_2$ ($<n_1$); and an outer core provided so as to surround the outer periphery of the intermediate core and having a refractive index $n_3$ ($>n_2$, $<n_1$). The cladding region (corresponding to the cladding region 100B in FIG. 1), which is provided so as to surround the outer periphery of the core region, has a refractive index $n_4$ ($=n_2$), whereby the respective refractive indices of the individual regions have the relationship in terms of magnitude of $n_2=n_4<n_3<n_1$. It is not always necessary for the refractive index $n_2$ of the intermediate core and the refractive index $n_4$ of the cladding region to coincide with each other.

The outside diameter $a_1$ of the center core is 5.2 μm, the outside diameter $a_2$ (equal to the outside diameter a of the core region) of the outer core surrounding the center core is 18.6 μm, the outside diameter $a_3$ of the intermediate core positioned between the center core and the outer core is 12.6 μm, and the outside diameter b of the cladding region surrounding the outer core is 125 μm. The relative refractive index difference of each region is given by expression (3) while the cladding region having the refractive index $n_4$ is employed as the reference area, whereby the maximum value $\Delta n_1$ of relative refractive index difference of the center core with respect to the cladding region is +0.95%, and the relative refractive index difference $\Delta n_3$ of the outer core with respect to the cladding region is +0.25%.

Upon measurement of various characteristics of the dispersion-shifted optical fiber according to the tenth embodiment, the zero-dispersion wavelength and the cutoff wavelength at a length of 2 m were 1708 nm and 1.62 μm, respectively. Also, with respect to light having a wavelength of 1550 nm, the effective area, the dispersion slope, the dispersion and the bending loss at a diameter of 32 mm were 47 μm$^2$, 0.08 ps/nm$^2$/km, −16.0 ps/nm/km and 0.01 dB/turn, respectively.

FIG. 15 is a table listing various characteristics of the dispersion-shifted optical fibers according to the first to tenth embodiments explained in the foregoing. Each of the dispersion-shifted optical fibers according to these embodiments has a zero-dispersion wavelength of 1610 nm or more but 1750 nm or less, and a cutoff wavelength of 1.1 μm or more at a length of 2 m, and has, with respect to light having a wavelength of 1550 nm, an effective area of 45 μm$^2$ or more and a dispersion slope of 0.15 ps/nm$^2$/km or less.

Therefore, each of the dispersion-shifted optical fibers is employable in WDM transmission systems including an optical fiber amplifier adapted to amplify light signals in a wavelength band of 1530 nm to 1610 nm, and effectively suppresses the occurrence of nonlinear phenomena such as four-wave mixing, self phase modulation, and the like, thereby realizing high-quality optical transmission. In particular, each of the dispersion-shifted optical fibers according to the second, fourth, and seventh to ninth embodiments has an effective area of 70 μm$^2$ or more, thus allowing the light signals propagating through the dispersion-shifted optical fiber to keep the power density at a lower level, thereby being able to further suppress the occurrence of nonlinear phenomena.

Also, each of the dispersion-shifted optical fibers has an excellent bending characteristic. Here, each of the dispersion-shifted optical fibers according to the fifth and ninth embodiments has a cutoff wavelength longer than the signal wavelength. In view of the fact that the actual transmission distance of light signals is several hundreds to several thousands of kilometers there are no problems since higher-order modes attenuate.

Without being restricted to the above-mentioned embodiments, the present invention can be modified in various manners. For instance, each of FIGS. 2 and 6 to 14 just shows an example of refractive index profiles, and various other shapes can be employed as the refractive index profile for realizing the dispersion-shifted optical fiber according to the present invention.

As in the foregoing, the dispersion-shifted optical fiber according to the present invention has a zero-dispersion wavelength of 1610 nm or more but 1750 nm or less, and a cutoff wavelength of 1.1 μm or more at a length of 2 m, and has, with respect to light having a wavelength of 1550 nm, an effective area of 45 μm$^2$ or more and a dispersion slope of 0.15 ps/nm$^2$/km or less. Therefore, even in the case where each light signal belonging in the wavelength band of 1530 nm to 1610 nm that can optically be amplified by an optical fiber amplifier having an expanded amplification wavelength band propagates through this dispersion-shifted optical fiber, the occurrence of nonlinear phenomena such as four-wave mixing, self phase modulation, and the like is effectively suppressed. Also, since the dispersion-shifted optical fiber according to the present invention has an excellent bending characteristic, high-performance optical transmission can sufficiently be realized over a wide band.

In the case where the effective area is 70 μm$^2$ or more, the power density of each light signal propagating through the dispersion-shifted optical fiber is kept lower, whereby the occurrence of nonlinear phenomena is further effectively suppressed, and higher-quality optical transmission can be realized.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-shifted optical fiber comprising a core region extending along a predetermined axis and a cladding region provided on the outer periphery of said core region and having a zero-dispersion wavelength of 1610 nm or more but 1670 nm or less;

said dispersion-shifted optical fiber having:
  an effective area of 50 μm$^2$ or more with respect to light having a wavelength of 1550 nm; and
  a dispersion slope of 0.15 ps/nm$^2$/km or less with respect with light having a wavelength of 1550 nm.

2. A dispersion-shifted optical fiber according to claim 1, having an effective area of 70 μm$^2$ or more.

3. A dispersion-shifted optical fiber according to claim 1, wherein said core region compromises a center core having a predetermined refractive index, and an outer core provided on the outer periphery of said center core and having a lower refractive index than said center core.

4. A dispersion-shifted optical fiber according to claim 3, wherein the maximum value of relative refractive index difference of said center core with respect to a reference area in said cladding region is 0.9% or more.

5. A dispersion-shifted optical fiber according to claim 1, wherein said core region comprises a center core having a predetermined refractive index; an immediate core provided on the outer periphery of said center core region and having a refractive index lower than that of said center core; and an outer core provided on the outer periphery of said intermediate core and having a higher refractive index than said intermediate core.

6. A dispersion-shifted optical fiber according to claim 5, wherein the maximum value of relative refractive index difference of said center core with respect to reference area in said cladding region is 0.6% or more.

7. A dispersion-shifted optical fiber according to claim 1, wherein said core region comprises a center core having a predetermined refractive index; and an outer core provided on the outer periphery of said center core and having a higher refractive index than said center core.

8. A dispersion-shifted optical fiber according to claim 7, wherein the maximum value of relative refractive index difference of said outer core with respect to a reference area in said cladding region is 0.8% or more.

9. A WDM transmission system including a dispersion-shifted optical fiber through which signals having a plurality of wavelengths within a range of 1530 nm or more but 1610 nm or less propagate, wherein said dispersion-shifted optical fiber comprises:
a core region extending along a predetermined axis; and
a cladding region provided on the outer periphery of said core region, and wherein said dispersion-shifted optical fiber has:
a zero-dispersion wavelength of 1610 nm or more but 1670 nm or less;
a cutoff wavelength of 1.1 $\mu$m or more at a length of 2 m;
an effective area of 50 $\mu m^2$ or more with respect to light having a wavelength of 1550 nm; and
a dispersion slope of 0.15 ps/nm$^2$/km or less with respect to light having a wavelength of 1550 nm.

10. A WDM transmission system including a dispersion-shifted optical fiber through which signals having a plurality of wavelengths within a range of 1530 nm or more but 1610 nm or less propagate, wherein said dispersion-shifted optical fiber comprises:
a core region extending along a predetermined axis; and
a cladding region provided on the outer periphery of said core region, and wherein said dispersion-shifted optical fiber has:
a zero-dispersion wavelength of 1640 nm or more but 1750 nm or less;
a cutoff wavelength of 1.1 $\mu$m or more at a length of 2 m;
an effective area of 45 $\mu m^2$ or more with respect to light having a wavelength of 1550 nm; and
a dispersion slope of 0.15 ps/nn$^2$/km or less with respect to light having a wavelength of 1550 nm.

11. A WDM transmission system including a dispersion-shifted optical fiber through which signals having a plurality of wavelengths within a range of 1530 nm or more but 1610 nm or less propagate, wherein said dispersion-shifted optical fiber comprises:
a core region extending along a predetermined axis; and
a cladding region provided on the outer periphery of said core region, and wherein said dispersion-shifted optical fiber has:
a zero-dispersion wavelength of 1610 nm or more but 1750 nm or less;
a cutoff wavelength of 1.1 $\mu$m or more at a length of 2 m;
an effective area of 45 $\mu m^2$ or more with respect to light having a wavelength of 1550 nm; and
a dispersion slope of 0.06 ps/nm$^2$/km or more but 0.15 ps/nm$^2$/km or less with respect to light having a wavelength of 1550 nm.

* * * * *